United States Patent [19]

Anan

[11] Patent Number: 5,287,279
[45] Date of Patent: Feb. 15, 1994

[54] ENGINE OUTPUT TORQUE CONTROL SYSTEM

[75] Inventor: Yoshiaki Anan, Hiroshima, Japan

[73] Assignee: Mazda Motor Corporation, Hiroshima, Japan

[21] Appl. No.: 792,937

[22] Filed: Nov. 15, 1991

[30] Foreign Application Priority Data

Nov. 30, 1990 [JP] Japan .................. 2-339115

[51] Int. Cl.⁵ .............................................. B60K 28/16
[52] U.S. Cl. ...................... 364/426.02; 364/426.03; 180/197; 123/333; 123/481
[58] Field of Search .................. 364/426.02, 426.03; 180/197; 123/333, 481, 493, 332

[56] References Cited

U.S. PATENT DOCUMENTS

| | | | |
|---|---|---|---|
| 4,432,430 | 2/1984 | Lind et al. ........................ | 123/481 |
| 4,933,857 | 6/1990 | Hashiguchi et al. ........... | 364/426.03 |
| 4,951,773 | 8/1990 | Poirier et al. .................. | 123/333 |
| 5,038,883 | 8/1991 | Kushi et al. .................... | 123/333 |
| 5,067,579 | 11/1991 | Kushi et al. .................... | 180/197 |
| 5,099,942 | 3/1992 | Kushi et al. .................... | 364/426.03 |
| 5,136,996 | 8/1992 | Kushi et al. .................... | 123/332 |
| 5,137,105 | 8/1992 | Suzuki et al. ................... | 180/197 |
| 5,168,952 | 12/1992 | Oono et al. ..................... | 180/197 |

FOREIGN PATENT DOCUMENTS

58-8436  1/1983  Japan .

Primary Examiner—Gary Chin
Attorney, Agent, or Firm—Sixbey, Friedman, Leedom & Ferguson

[57] ABSTRACT

An output torque control system for a multiple cylinder engine limits fuel supply to one or more selected cylinder(s) of the engine according to a predetermined fuel limiting pattern when the engine output torque reduction is to be performed. Fuel supply to the cylinder which first comes to the fuel injection timing after it is determined that the engine output torque reduction is to be performed is limited at least in the fuel injection timing immediately after the determination independently from the predetermined fuel limiting pattern.

10 Claims, 5 Drawing Sheets

| LEVEL \ CYLINDER No. | 1st CYCLE | | | | | | 2nd CYCLE | | | | | | 3rd CYCLE | | |
|---|---|---|---|---|---|---|---|---|---|---|---|---|---|---|---|
| | 1 | 2 | 3 | 4 | 5 | 6 | 1 | 2 | 3 | 4 | 5 | 6 | 1 | 2 | ... |
| 0 | | | | | | | | | | | | | | | ... |
| 1 | X | | | | | | | | | | | | X | | ... |
| 2 | | X | | | | | | X | | | | | | X | ... |
| 3 | | X | X | | | | | X | | | | | | X | ... |
| 4 | X | X | | | | | X | X | | | | | X | X | ... |
| 5 | X | X | X | | | | X | X | | | | | X | X | ... |
| 6 | X | X | | X | | | X | X | | X | | | X | X | ... |
| 7 | X | X | | X | X | | X | X | | X | | | X | X | ... |
| 8 | X | X | X | X | | | X | X | X | X | | | X | X | ... |
| 9 | X | X | X | X | | X | X | X | X | X | | | X | X | ... |
| 10 | X | X | X | X | X | | X | X | X | X | X | | X | X | ... |
| 11 | X | X | X | X | X | X | X | X | X | X | X | | X | X | ... |
| 12 | X | X | X | X | X | X | X | X | X | X | X | X | X | X | ... |

X: FUEL CUT

ENGINE OUTPUT TORQUE CONTROL SYSTEM

BACKGROUND OF THE INVENTION

1. Field of the Invention

This invention relates to an output torque control system for a multiple cylinder engine.

2. Description of the Prior Art

As disclosed, for instance, in Japanese Unexamined Patent Publication No. 58(1983)-8436, there has been known a traction control system in which fuel supply to an engine is limited on the basis of a torque reduction requirement which is determined according to slip of the driving wheels so that the engine output torque is reduced and the slip of the driving wheels is suppressed.

In the conventional traction control system or the conventional engine output torque control system, the fuel supply is limited on a predetermined particular cylinder or predetermined particular cylinders when slip of the driving wheels is detected, which gives rise to the following problem. For example, supposing that an engine has cylinder-A, cylinder-B, cylinder-C and cylinder-D and fuel is injected into the cylinder in sequence in this order and fuel supply to the cylinder-A is limited upon detection of slip of the driving wheels, fuel supply to the engine is not limited until the fuel injection timing to the cylinder-A even if slip of the driving wheels is detected at the injection timing to the cylinder-B. As a result, the engine output torque sometimes can be left as it is for a long time, and slip of the driving wheels cannot be quickly suppressed in response to detection of slip of the driving wheels.

SUMMARY OF THE INVENTION

In view of the foregoing observations and description, the primary object of the present invention is to provide an engine output torque control system which can reduce the engine output torque quickly when reduction of the engine output torque comes to be required.

In accordance with the present invention, fuel supply to the cylinder which first comes to the fuel injection timing after a predetermined torque-reduction condition is satisfied is limited at least in the fuel injection timing immediately after satisfaction of the predetermined torque-reduction condition.

That is, in accordance with the present invention, there is provided an output torque control system for a multiple cylinder engine comprising a torque reduction determining means which determines whether a predetermined torque-reduction condition has been satisfied and determines that the engine output torque reduction is to be performed when the torque-reduction condition has been satisfied, a fuel supply limiting means which limits fuel supply to one or more selected cylinder(s) of the engine when the torque reduction determining means determines that the engine output torque reduction is to be performed, a fuel injection cylinder determining means which determines which of the cylinders comes to the fuel injection timing, and a fuel supply limitation control means which causes the fuel supply limiting means to limit fuel supply to the cylinder which first comes to the fuel injection timing after the torque reduction determining means determines that the engine output torque reduction is to be performed at least in the fuel injection timing immediately after the determination.

Preferably the engine output torque control system of the present invention is provided with a torque reduction requirement level determining means which determines the torque reduction requirement level which represents how much the engine output torque is to be reduced, the fuel supply limiting means limits fuel supply to one or more cylinder(s) of the engine which is selected according to a predetermined fuel limiting pattern on the basis of the torque reduction requirement level determined by the torque reduction requirement level, and the fuel supply limitation control means causes the fuel supply limiting means to limit fuel supply to the cylinder which first comes to the fuel injection timing after the torque reduction determining means determines that the engine output torque reduction is to be performed, irrespective of whether the fuel supply to the relevant cylinder is to be limited according to the pattern, only in the first injection timing after the determination.

More preferably in the fuel limiting pattern, the cylinder or cylinders fuel supply to which is to be limited is designated by the numbers of the cylinders which are set depending on the order in which the cylinders come to the injection timing after the torque reduction determining means determines that the engine output torque reduction is to be performed.

DESCRIPTION OF THE PREFERRED EMBODIMENT

Figure 1:
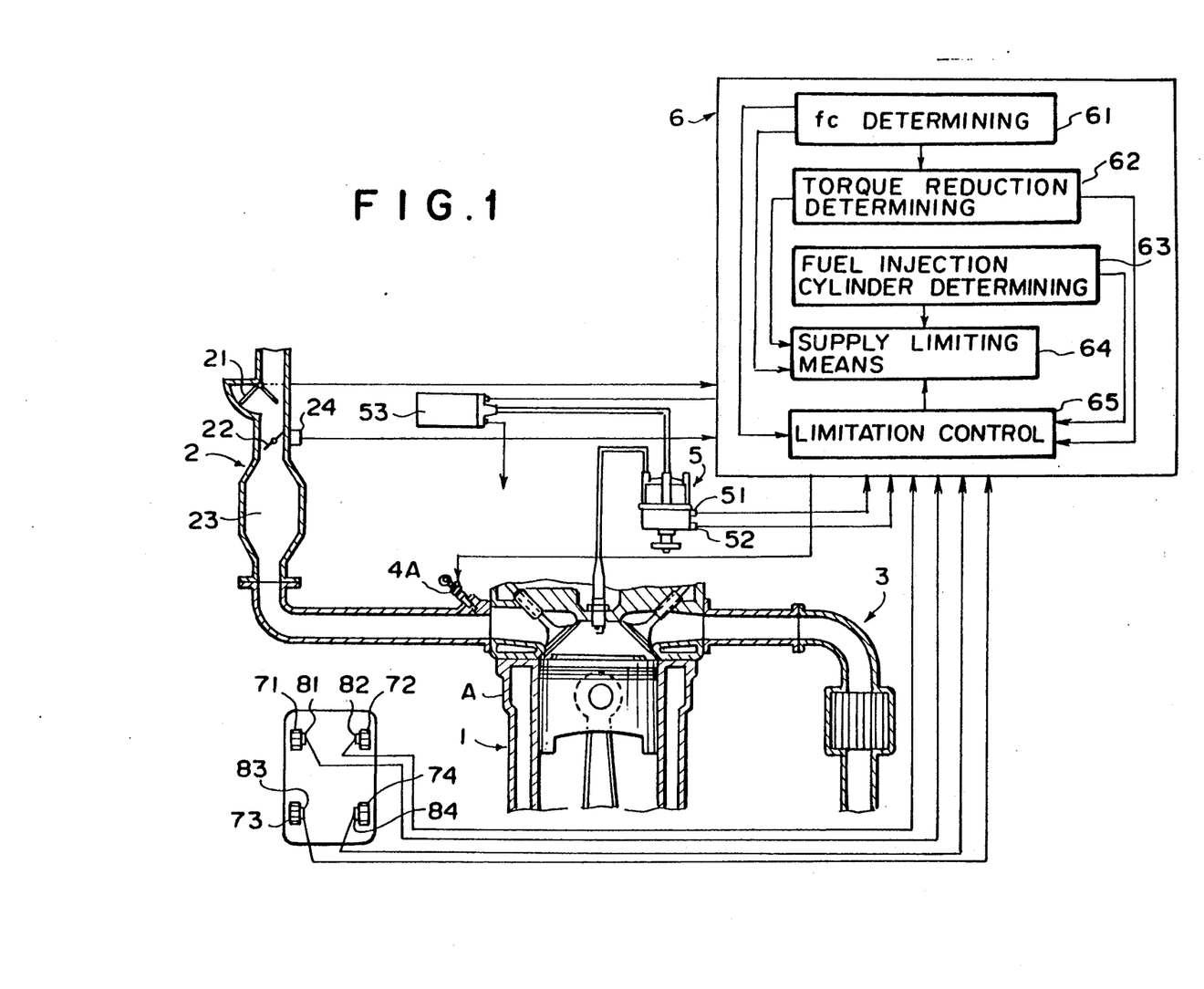
FIG. 1 is a schematic cross-sectional view of an engine provided with an engine output torque control system in accordance with an embodiment of the present invention.
Figure 2:
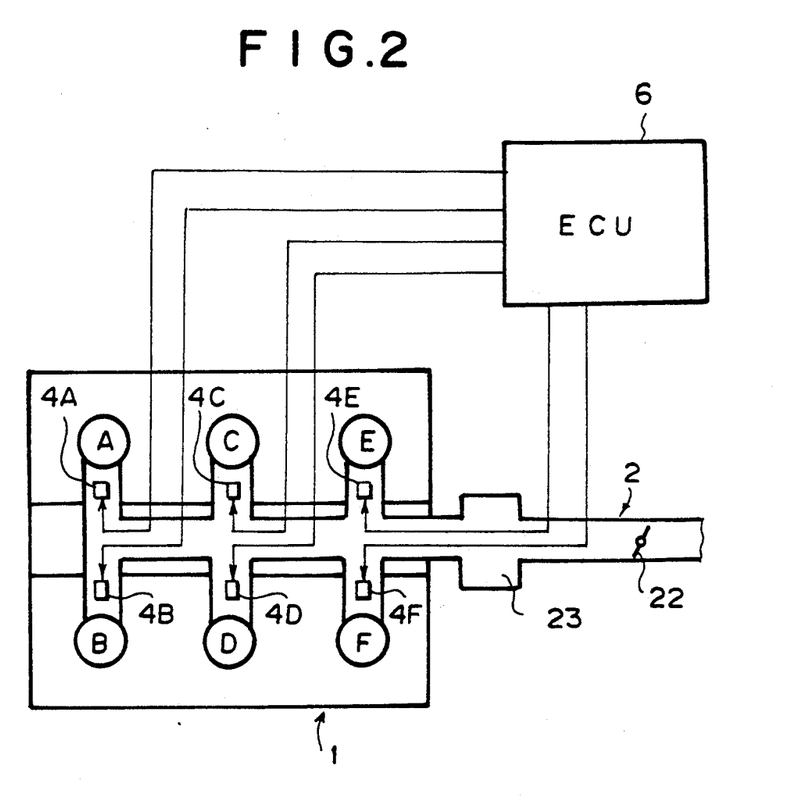
FIG. 2 is a schematic plan view of the engine.

In FIGS. 1 and 2, a V-6 engine 1 has six cylinders, cylinder-A to cylinder-F which are connected to an intake passage 2 and an exhaust passage 3. The intake passage 2 is provided with an airflow meter 21 for detecting an intake air amount Q, a throttle valve 22 and a surge tank 23 in this order from the upstream end. The downstream end portion of the intake passage 2 branches into discrete passages which respectively lead to the cylinder-A to cylinder-F and fuel injectors 4A to 4F are provided in the respective discrete passages. The fuel injectors 4A to 4F are actuated in sequence in this order. That is, fuel is injected into the cylinder-A to cylinder-F in sequence in this order.

Reference numeral 5 denotes a distributor and a crank angle sensor 51 and a cylinder sensor 52 are mounted on the distributor 5. The crank angle sensor 51 outputs a detecting signal each time one of the cylinder-A to cylinder-F comes to the fuel injection timing, and the cylinder sensor 52 outputs a detecting signal each time a predetermined cylinder, e.g., the cylinder-A, comes to the fuel injection timing. The detecting signals of the sensors 51 and 52 are input into an engine control unit 6.

Further the detecting signals of the airflow meter 21, a throttle position sensor 24, driving wheel speed sensor 81 and 82 which detect the wheel speeds of front wheels 71 and 72 (the driving wheels), and driven wheel speed sensors 83 and 84 which detect the wheel speeds of rear wheels 73 and 74 (the driven wheels) are input into the engine control unit 6. The engine control unit 6 outputs an ignition timing control signal representing the ignition timing which is determined on the basis of the engine speed N and the intake air amount Q to an ignition coil 53, and outputs fuel injection amount control signals, which represents the amount of fuel to be injected determined on the basis of the engine speed N and the intake air amount Q, to the injectors 4A to 4F at predetermined times. The engine speed N is determined on the basis of the detecting signals of the crank angle sensor 51 and the cylinder sensor 52.

The engine control unit 6 forms a torque reduction requirement level determining means 61, a torque reduction determining means 62, a fuel injection cylinder determining means 63, a fuel supply limiting means 64 and a fuel supply limitation control means 65. The torque reduction requirement level determining means 61 determines the degree of slip of the driving wheels on the basis of the difference between the wheel speeds detected by the driving wheel speed sensors 81 and 82 and the driven wheel speed sensors 83 and 84, and determines the torque reduction requirement level according to the degree of slip of the driving wheels. In this particular embodiment, the torque reduction requirement level is classified into thirteen levels, level 0 to level 12.

The torque reduction determining means 62 determines whether a predetermined torque-reduction condition has been satisfied and determines that the engine output torque reduction is to be performed when the torque-reduction condition has been satisfied. More particularly, when the torque reduction requirement level determined by the torque reduction requirement level determining means 61 is higher than 0, the torque reduction determining means 62 determines that the predetermined torque-reduction condition has been satisfied and determines that the engine output torque reduction is to be performed.

The fuel injection cylinder determining means 63 determines which of the cylinders comes to the fuel injection timing.

The fuel supply limiting means 64 limits fuel supply to the engine 1 when the torque reduction determining means 62 determines that the engine output torque reduction is to be performed. The fuel supply limiting means 64 limits fuel supply to the engine 1 according to the pattern shown in FIG. 3 on the basis of the torque reduction requirement level determined by the torque reduction requirement level determining means 61.

Figure 3:
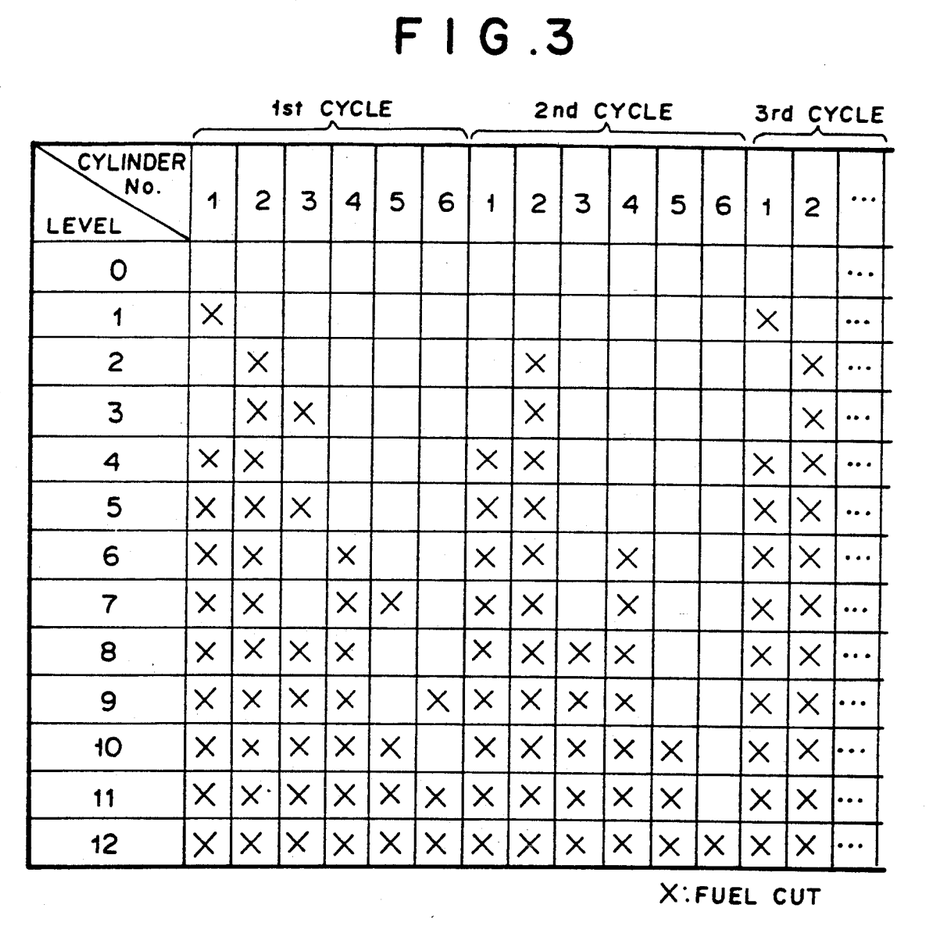
FIG. 3 is a pattern according to which fuel supply to the engine is limited for a given engine output torque reduction requirement level.

In the pattern shown in FIG. 3, fuel supply to a single cylinder is limited at level 1 and level 2, and each time the torque reduction requirement level rises by two stages, the number of cylinders fuel supply to which is limited is increased by one. At the even number levels, fuel supply to all the designated cylinder(s) is cut every cycle, and at the odd number levels, fuel supply to one of the designated cylinder(s) is cut every other cycle (thinned-out fuel injection) while fuel supply to the other designated cylinder(s) is cut every cycle. It should be noted that the cylinder fuel supply to which is cut every other cycle at a given torque reduction requirement level is not cut with fuel supply at the level higher or lower than the given level by one stage. This prevents fuel supply to a particular cylinder from being cut too frequently as compared with the other cylinders, thereby preventing combustion in a particular cylinder from deteriorating. In FIG. 3, the cylinder which first comes to the fuel injection timing after the torque reduction determining means 62 determines that the engine output torque reduction is to be performed is set to be #1 cylinder and the cylinder which next comes to the fuel injection timing is set to be #2 cylinder, and so on. For example, when the cylinder-B first comes to the fuel injection timing after the torque reduction determining means 62 determines that the engine output torque reduction is to be performed, the cylinder-B is #1 cylinder, the cylinder-C is #2 cylinder, the cylinder-D is #3 cylinder, and so on.

The fuel supply limitation control means 65 causes the fuel supply limiting means 63 to cut fuel supply to the cylinder which first comes to the fuel injection timing after the torque reduction determining means 62 determines that the engine output torque reduction is to be performed irrespective of whether the fuel supply to the relevant cylinder is to be cut according to the pattern shown in FIG. 3, only in the first cycle. From the second cycle on, the fuel supply limitation control means 65 causes the fuel supply limiting means 63 to cut fuel supply according to the pattern shown in FIG. 3. Further, the fuel supply limitation control means 65 causes the fuel supply limiting means 63 to cut fuel supply to the cylinder which first comes to the fuel injection timing after the torque reduction requirement level determined by the torque reduction requirement level determining means 61 rises irrespective of whether the fuel supply to the relevant cylinder is to be cut according to the pattern shown in FIG. 3, only in the first cycle. When the torque reduction requirement level is kept constant or lowers, fuel supply is cut according to the pattern shown in FIG. 3.

The operation of the engine control unit 6 will be described with reference to the flow chart shown in FIG. 4, hereinbelow.

The engine control unit 6 first reads the detecting signals from the crank angle sensor 51, the cylinder sensor 52, the airflow meter 21, the driving wheel speed sensors 81 and 82, the driven wheel speed sensors 83 and 84, and the like. (step S1) Then the engine control unit 6 calculates the torque reduction requirement level fc on the basis of the difference between the wheel speed of the driving wheels detected by the driving wheel speed sensors 81 and 82 and the wheel speed of the driven wheels detected by the driven wheel speed sensors 83 and 84, and determines whether the torque reduction requirement level fc is higher than 0. (steps S2 and S3)

When it is determined step S3 that the torque reduction requirement level fc is 0, the engine control unit 6 permits all the injectors 4A to 4F to inject fuel as usual. (step S4) On the other hand, when it is determined step S3 that the torque reduction requirement level fc is higher than 0, the engine control unit 6 determines in step S5 whether the answer to the question in step S3 in the preceding flow was also YES. When it is determined that the answer to the question in step S3 in the preceding flow was No, that is, when the torque reduction requirement level fc turns higher than 0 at the present flow, the engine control unit 6 sets the cylinder numbers in the manner described above (step S6) and then proceeds to step S7, and otherwise the engine control unit 6 directly proceeds to step S7.

In step S7, the engine control unit 6 determines whether the torque reduction requirement level fc is 1. When it is determined that the torque reduction requirement level fc is 1, the engine control unit 6 determines in step S8 whether the torque reduction requirement level fc was not lower than 1 in the preceding flow.

When it is determined in step S8 that the torque reduction requirement level fc was lower than 1 in the preceding flow, the engine control unit 6 causes the injector for the cylinder which first comes to the injection timing not to inject fuel. (step S9) That is, when the torque reduction requirement level fc rises from 0 to 1, fuel supply to the cylinder which first comes to the injection timing is cut.

On the other hand, when it is determined in step S8 that the torque reduction requirement level fc was not lower than 1 in the preceding flow, that is, when the torque reduction requirement level fc in the present flow is equal to or lower than that in the preceding flow, the engine control unit 6 controls the injectors according to the pattern shown in FIG. 3. That is, the engine control unit 6 determines in step S10 whether it is the injection timing for #1 cylinder, and when it is determined that it is not the injection timing for #1 cylinder, the engine control unit 6 causes the injector for the cylinder in the injection timing to inject fuel (step S11). Otherwise, the engine control unit 6 effects the thinned-out injection for #1 cylinder. That is, when the injector for #1 cylinder injected fuel in the preceding flow, the engine control unit 6 inhibits the injector for #1 cylinder from injecting fuel, and otherwise, it causes the injector for #1 cylinder to inject fuel. (steps S12 to S14)

When it is determined in step S7 that the torque reduction requirement level fc is not 1, the engine control unit 6 determines in step S15 whether the torque reduction requirement level is 2, and when it is determined that the torque reduction requirement level fc is 2, the engine control unit 6 determines in step S16 whether the torque reduction requirement level fc was not lower than 2 in the preceding flow.

When it is determined in step S16 that the torque reduction requirement level fc was lower than 2 in the preceding flow, the engine control unit 6 causes the injector for the cylinder which first comes to the injection timing not to inject fuel. (step S17) That is, when the torque reduction requirement level fc rises from 1 to 2, fuel supply to the cylinder which first comes to the injection timing is cut.

On the other hand, when it is determined in step S16 that the torque reduction requirement level fc was not lower than 2 in the preceding flow, that is, when the torque reduction requirement level fc in the present flow is equal to or lower than that in the preceding flow, the engine control unit 6 controls the injectors according to the pattern shown in FIG. 3. That is, the engine control unit 6 determines in step S18 whether it is the injection timing for #2 cylinder, and when it is determined that it is not the injection timing for #2 cylinder, the engine control unit 6 causes the injectors for the cylinder in the injection timing to inject fuel (step S19). Otherwise, the engine control unit 6 inhibits the injector for #2 cylinder from injecting fuel. (step S20)

Figure 4A:
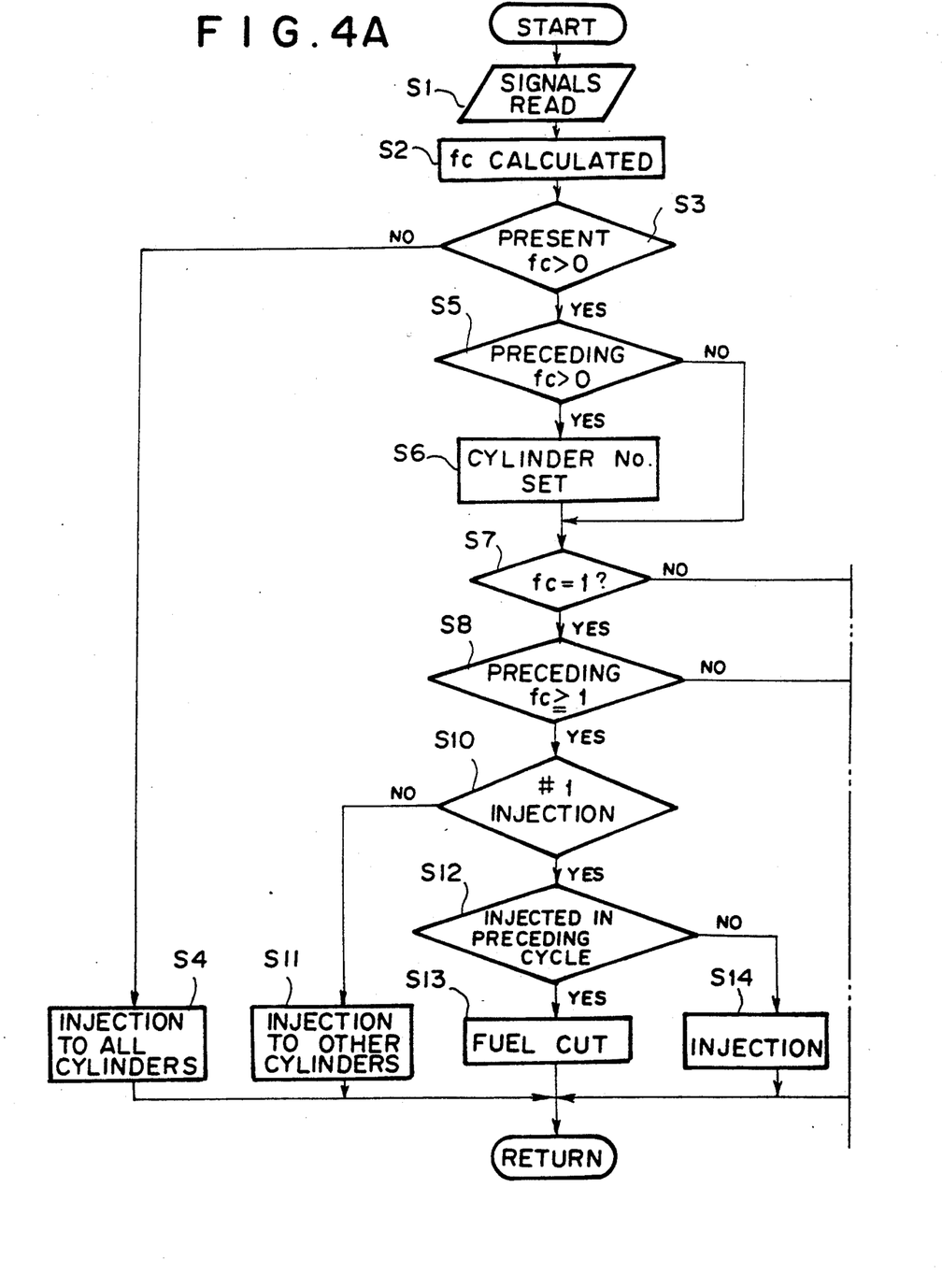
FIGS. 4A and 4B are flow charts for illustrating the operation of the engine control unit.
Figure 4B:
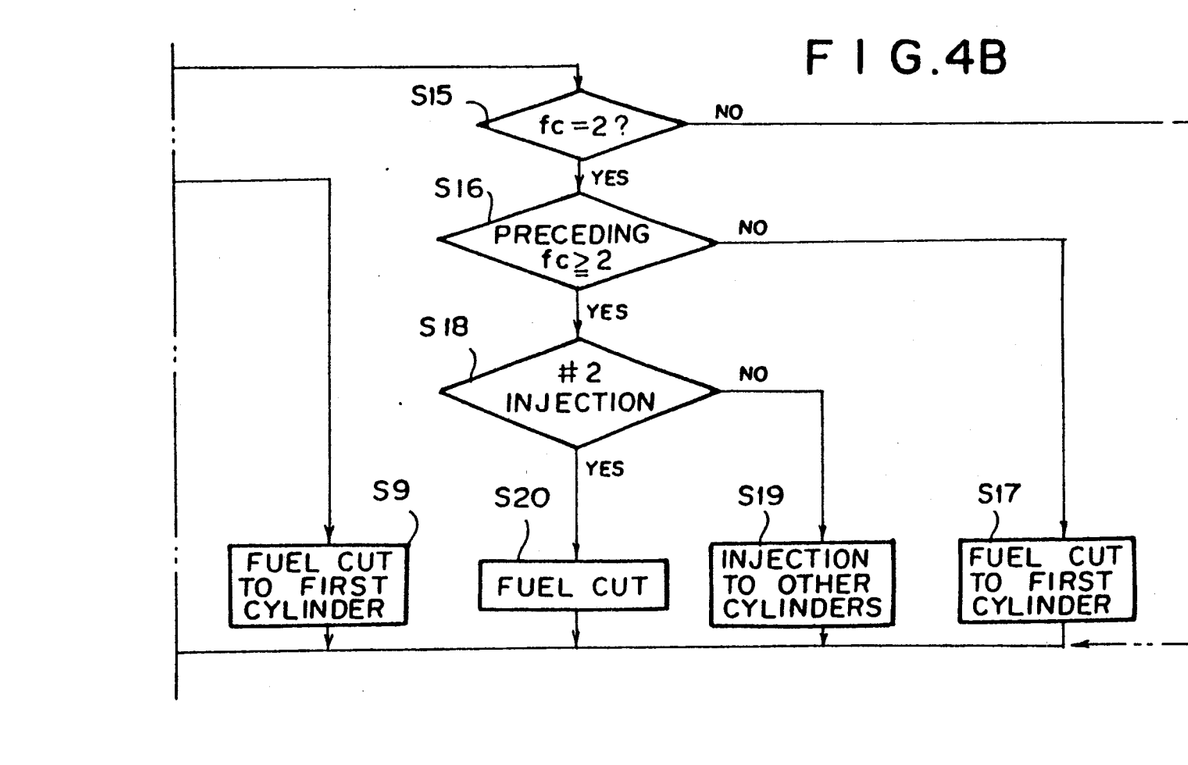

When it is determined in step S15 that the torque reduction requirement level fc is not 2, the engine control unit 6 performs control similar to that in step S7 and the steps following the step S7 though not shown in FIG. 4. That is, when the torque reduction requirement level fc rises, fuel supply to the cylinder which first comes to the injection timing is cut and when the torque reduction requirement level fc in the present flow is equal to or lower than that in the preceding flow, the injectors for the respective cylinders are controlled according to the pattern shown in FIG. 3.

As can be understood from the description above, in accordance with this embodiment, when the driving wheels come to slip and the engine output torque comes to be required, fuel supply to the cylinder which first comes to the fuel injection timing after the torque-reduction condition is satisfied is cut at least in the fuel injection timing immediately after satisfaction of the torque-reduction condition. Accordingly, the engine output torque can be quickly reduced in response to requirement and slip of the driving wheels can be quickly suppressed.

Further, in accordance with the present invention, when the degree of slip of the driving wheels increases and the torque reduction requirement level rises, fuel supply to the cylinder which first comes to the fuel injection timing after rise of the torque reduction requirement level is cut at least in the fuel injection timing immediately after rise of the same. Thus the engine output torque is quickly reduced when the torque reduction requirement level rises and slip of the driving wheels is prevented from increasing.

When the torque reduction requirement level is kept constant or is lowered, fuel supply to the respective cylinders is controlled according to the pattern shown in FIG. 3. In the pattern shown in FIG. 3, the number of the cylinders are set depending on the order in which the cylinders come to the injection timing after the torque-reduction condition is satisfied. Accordingly, any one of cylinder-A to cyliner-F can be #1 cylinder and which of the six cylinders is or are cut with fuel supply for a given torque reduction requirement level is not fixed. This prevents fuel supply to a particular cylinder from being cut too frequently as compared with the other cylinders, thereby preventing combustion in a particular cylinder from deteriorating.

Though, in the embodiment described above, the present invention is applied to the traction control system, this invention can also be applied to other systems so long as engine output torque reduction is required when a predetermined condition is satisfied. For example, this invention can be applied to the automatic transmission system where engine output torque reduction is required during gear-shifting.

What is claimed is:

1. An engine output torque control system for a multiple cylinder engine comprising
    a torque reduction determining means for determining whether a predetermined torque-reduction condition has been satisfied and determining an amount of the engine output torque reduction to be performed when the torque-reduction condition has been satisfied,
    a fuel supply limiting means for limiting fuel supply to at least one selected cylinder of the engine when the torque reduction determining means determines that the engine output reduction is to be performed,
    a fuel limiting level determining means for determining the number of cylinders to which fuel supply is to be limited according to the engine output torque reduction amount, a fuel injection cylinder determining means for determining which one of the cylinders is about to undergo fuel injection, and a fuel supply limitation control means for causing the fuel supply limiting means to limit fuel supply to the cylinder which first undergoes fuel injection after the torque reduction determining means determines that the engine output torque reduction is to be performed at least in the fuel injection timing immediately after the determining, and for causing the fuel supply limiting means to limit the fuel supply to the cylinders which are selected according to the number of cylinders determined by the fuel limiting level determining means.

2. An engine output torque control system as defined in claim 1 which further comprises a torque reduction requirement level determining means for determining the torque reduction requirement level which represents how much the engine output torque is to be reduced, and in which the fuel supply limiting means limits fuel supply to said at least one cylinder of the engine which is selected according to a predetermined fuel limiting pattern on the basis of the torque reduction requirement level determined by the torque reduction requirement level determining means, and the fuel supply limitation control means causes the fuel supply limiting means to limit fuel supply to the cylinder which first comes to the fuel injection timing after the torque reduction determining means determines that the engine output torque reduction is to be performed, irrespective of whether the fuel supply to the selected cylinder is to be limited according to the pattern, only in the first injection timing after the determination.

3. An engine output torque control system as defined in claim 2 in which said fuel limiting pattern is arranged so that the cylinder fuel supply to which fuel is to be limited is designated by the numbers of the cylinders which are set depending on the order in which the cylinder undergoes fuel injection timing after the torque reduction determining means determines that the engine output torque reduction is to be performed.

4. An engine output torque control system as defined in claim 3 in which said fuel limiting pattern is arranged so that fuel supply to one of the cylinders is cut every other injection timing when the torque reduction requirement level is the lowest, fuel supply to another one of the cylinders is cut every injection timing when the torque reduction requirement level is the second lowest, the number of the cylinders to which fuel supply is cut is increased by one as the torque reduction requirement level increases by two from the second lowest torque reduction requirement level, and fuel supply to an additional one of said cylinders is cut every other injection increases by one from the even number torque reduction requirement level.

5. An engine output torque control system as defined in claim 4 in which said fuel limiting pattern is arranged so that when the torque reduction requirement level is increased from a given odd number torque reduction requirement level to the next higher even number torque reduction requirement level, fuel supply to an additional one of said cylinders which differs form that with cylinder whose fuel supply is cut every other injection timing in the given odd number torque reduction requirement level is cut every injection timing.

6. An engine output torque control system as defined in claim 1 in which when the torque reduction requirement level rises, said fuel supply limitation control means causes the fuel supply limiting means to limit fuel supply to the cylinder which first undergoes fuel injection timing after a rise of the torque reduction requirement level at least in the fuel injection timing immediately after the rise of the torque reduction requirement level.

7. An engine output torque control system as defined in claim 1 in which said torque reduction determining means determines that the engine output torque reduction is to be performed when slip of the driving wheels of a vehicle on which the engine is mounted exceeds a predetermined value.

8. An engine output torque control system for a multiple cylinder engine comprising a torque reduction determining means for determining whether a predetermine torque-reduction condition has been satisfied and determines an amount of the engine output torque reduction is to be performed when the torque-reduction condition has been satisfied, a fuel supply cutting means for cutting fuel supply to at least one selected cylinder of the engine when the torque reduction determining means determines that the engine output torque reduction is to be performed, a fuel cutting level determining means which determines the number of cylinders to which fuel supply is to be out according to the engine output torque reduction amount, a fuel injection cylinder determining means which determines which of the cylinders is about to undergo fuel injection, and a fuel supply cutting control means for causing the fuel supply cutting means to cut fuel supply to the cylinder which first undergoes fuel injection after the torque reduction determining means determines that the engine output torque reduction is to be performed at least in the fuel injection timing immediately after the determination, and for causing the fuel supply cutting means to cut the fuel supply to the cylinders which are selected according to the number of cylinders determined by the fuel cutting level determining means.

9. An engine output torque control system for a multiple cylinder engine comprising a torque reduction determining means for determining whether a predetermined torque-reduction condition has been satisfied and determines an amount of the engine output torque reduction to be performed when the torque-reduction condition has been satisfied, a fuel supply limiting means for limiting fuel supply to at least one selected cylinder of the engine when the torque reduction determining means determines that the engine output torque reduction is to be performed, a fuel injection cylinder determining means for determining which one of the cylinders is about to undergo fuel injection, a fuel limiting combination determining means for determining an actual combination of cylinders to which fuel supply is to be limited in response to the determination of said one of the cylinders by the fuel injection cylinder determining means, the engine output torque reduction amount and a predetermined map showing the relation between the engine output torque reduction amount and a hypothetical combination of cylinders top which fuel supply is to be limited so that the cylinders to which fuel supply is to be limited are determined according to the results of the determination of said one of the cylinders, and a fuel supply limitation control means for causing the fuel supply limiting means to limit fuel supply to the cylinders in response to the determination by the fuel limiting combination determining means.

10. An engine output torque control system as defined in claim 9, further comprising a fuel limiting level determining means for determining the number of cylinders to which fuel supply is to be limited according to the engine output torque reduction amount.

* * * * *